United States Patent
Nurmi

(10) Patent No.: US 8,995,990 B2
(45) Date of Patent: Mar. 31, 2015

(54) METHOD, AN APPARATUS, AND A SYSTEM FOR CREATING AN INTELLIGENT RECIPIENT LIST CONFIGURED TO DYNAMICALLY IDENTIFY AND PRESENT ADDITIONAL RECIPIENTS TO THE USER

(75) Inventor: Mikko A. Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 812 days.

(21) Appl. No.: 11/931,453

(22) Filed: Oct. 31, 2007

(65) Prior Publication Data

US 2009/0111447 A1    Apr. 30, 2009

(51) Int. Cl.
*H04W 24/00* (2009.01)
*H04M 1/725* (2006.01)
*G06Q 10/10* (2012.01)
*H04M 1/2745* (2006.01)

(52) U.S. Cl.
CPC ......... *H04M 1/72547* (2013.01); *G06Q 10/107* (2013.01); *H04M 1/274583* (2013.01)
USPC ........ 455/424; 455/418; 455/466; 455/550.1; 455/412.2; 455/414.2; 715/739; 715/738; 707/7

(58) Field of Classification Search
CPC ......... G06Q 10/107; H04M 1/274583; H04M 1/72547
USPC ........ 455/418, 424, 466, 412.1–412.2, 456.1, 455/414.4, 415; 379/88.03, 93.17, 93.23
See application file for complete search history.

(56) References Cited

U.S. PATENT DOCUMENTS

| | | | |
|---|---|---|---|
| 7,801,284 B1* | 9/2010 | Chakra et al. | 379/88.03 |
| 2004/0135816 A1* | 7/2004 | Schwartz et al. | 345/811 |
| 2004/0203949 A1 | 10/2004 | Nielsen et al. | |
| 2005/0009541 A1* | 1/2005 | Ye et al. | 455/466 |
| 2007/0038708 A1 | 2/2007 | Atyam et al. | |
| 2007/0050455 A1* | 3/2007 | Yach et al. | 709/206 |
| 2007/0050456 A1* | 3/2007 | Vuong et al. | 709/206 |
| 2008/0071873 A1* | 3/2008 | Gross | 709/206 |
| 2009/0037413 A1* | 2/2009 | Castell et al. | 707/7 |

FOREIGN PATENT DOCUMENTS

WO    00/22860 A    4/2000

OTHER PUBLICATIONS

International Search Report and Written Opinion, PCT/IB2008/002893, mailed May 4, 2009.
Office Action for Korean Application No. 10-2010-7011808 dated Oct. 25, 2011.
European Office Action for Application No. 08844391.6 dated Sep. 13, 2013.
Office Action from corresponding European Patent Application No. 08844391.6, dated Sep. 15, 2014.

* cited by examiner

*Primary Examiner* — Babar Sarwar
(74) *Attorney, Agent, or Firm* — Alston & Bird LLP

(57) ABSTRACT

Selecting at least one recipient to receive a communication, identifying and presenting a list of additional recipients to the user, the additional recipient list including contacts who have received messages in combination with the at least one selected recipient in the past, and allowing the user to select one or more of the additional recipients to receive the communication.

21 Claims, 8 Drawing Sheets

METHOD, AN APPARATUS, AND A SYSTEM FOR CREATING AN INTELLIGENT RECIPIENT LIST CONFIGURED TO DYNAMICALLY IDENTIFY AND PRESENT ADDITIONAL RECIPIENTS TO THE USER

BACKGROUND

1. Field

The disclosed embodiments generally relate to messaging applications and in particular to adaptive recipient selection in messaging applications.

2. Brief Description of Related Developments

In current recipient lists, the contacts can be shown in a variety of different ways. For example, the order of contacts can be shown in alphabetical order, most used contacts can be shown first on the menu list, or recently used contacts can be shown first. In many cases, a user might send a message to more than one recipient, and pull contacts from a contacts application. It also occurs that a user might repeatedly select the same recipients to receive certain types of messages or messages related to the same or similar subject matter. Unless sometime of a group is created, this requires the user to manually select each desired recipient. With a group list, the user may not always desire to include each recipient in the group and it can be cumbersome to create many groups for different circumstances. There is no system that suggests selection of another recipient based on first recipient selection or group of previous recipient selections. It would be advantageous to have intelligent recipient selection that improves usability and efficiency of use.

When creating a message, such as an email or text message, for example, one or more recipients can be selected. The recipients address can be manually entered or selected from a list. Most messaging applications have, or are associated with or to, an address application or other contact application or database. Messaging applications typically allow for multiple recipients to receive a message. In many cases, group lists can be formed and stored. This allows for messages of a similar subject matter or directed to specific groups to easily be sent to multiple recipients, without the need to individually enter recipient addresses. However, such recipient groups or groupings may not be widely used because users will not always go through the effort to create groups for all of the different recipients and various situations that might be considered group communications.

SUMMARY

In one aspect the disclosed embodiments are related to creating an additional recipient list for a communication. In one embodiment, the method includes selecting at least one recipient to receive a communication, identifying and presenting a list of additional recipients to the user, the additional recipient list including contacts who have received messages in combination with the at least one selected recipient in the past, and allowing the user to select one of more of the additional recipients to receive the communication.

BRIEF DESCRIPTION OF THE DRAWINGS

The foregoing aspects and other features of the embodiments are explained in the following description, with reference to the accompanying drawings, in which.

DETAILED DESCRIPTION OF THE EMBODIMENT(S)

Figure 1:
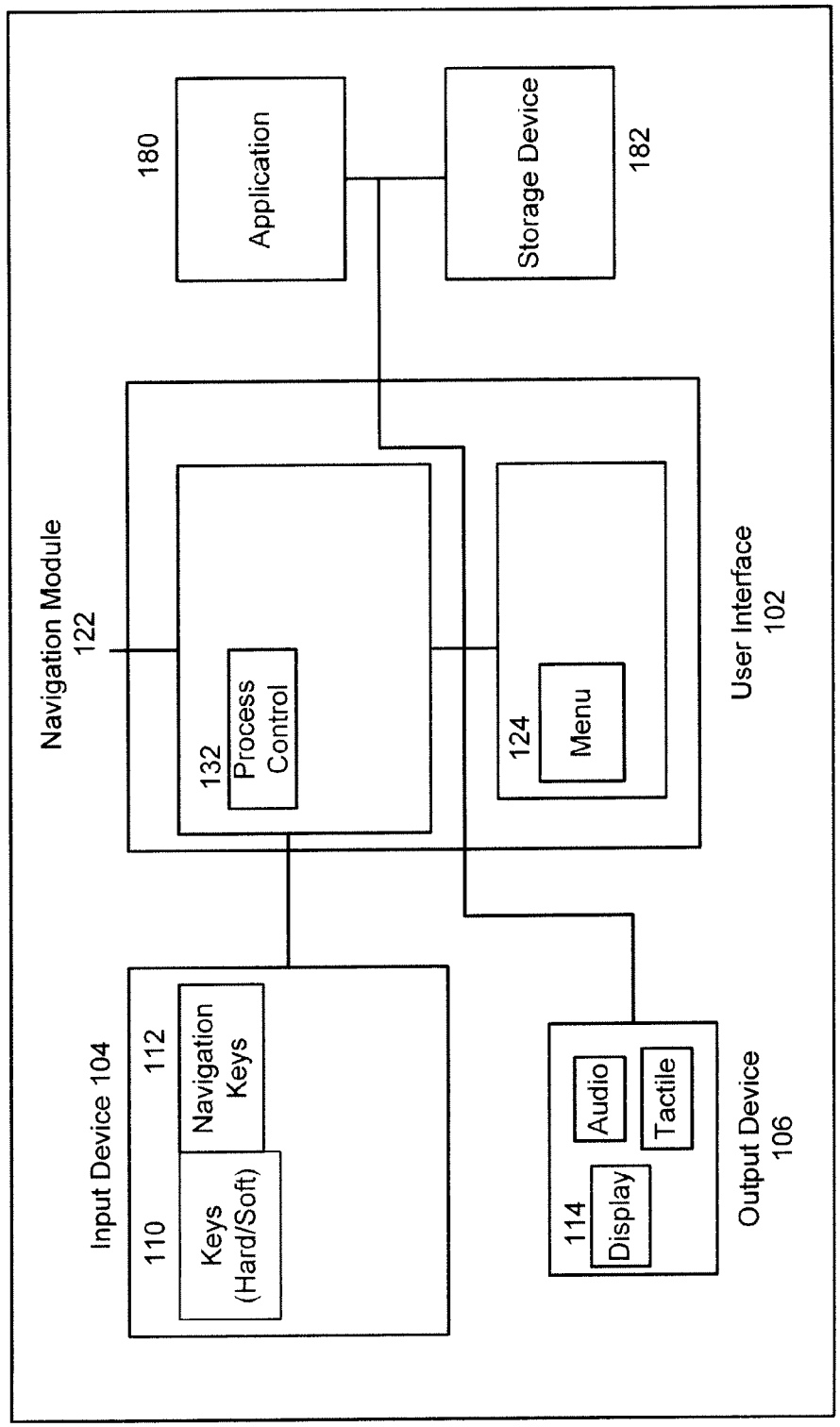
FIG. 1 illustrates one example of a system in which aspects of the disclosed embodiments may be applied.

Referring to FIG. 1, one embodiment of a system 100 is illustrated that can be used to practice aspects of the claimed invention. Although aspects of the claimed invention will be described with reference to the embodiments shown in the drawings and described below, it should be understood that these aspects could be embodied in many alternate forms of embodiments. In addition, any suitable size, shape or type of elements or materials could be used.

The disclosed embodiments allow for creating recipient lists or adding recipients to receive communications, intuitively, by providing an intelligent recipient list solution. The term "communication" or "message", as used herein is generally intended to encompass all forms of electronic communications, including, but not limited to, emails, text messaging, instant messaging, voice mail, conference calls, and internet-based communications.

In one embodiment, the system 100 of FIG. 1 stores information related to messages and other types of communications. For example, the system 100 is configured to store information about recipients of messages and communications. Thus, when a message is sent or received, the system 100 records information that correlates the primary recipient, or each recipient, with each other recipient of the message. The information recorded will allow the system 100 to identify, when a recipient(s) is selected for message which other contacts have also been selected to receive the same message(s) in combination with this selected recipient. Similarly, for a telephone, Internet or other conference call, the system 100 can determine and identify which contacts were parties to other communications in combination with the selected recipient of the current communication.

In one embodiment, the system 100 is configured to identify the subject matter of a communication and determine those contacts that have previously been the recipient of communications having the same or a similar subject matter. A list of these contacts can be created and the user can select the desired recipients therefrom. The subject matter of a communication can be determined in any suitable manner, including for example, parsing the subject line of the message.

For example, User X sends or receives a message that has also been sent to contacts A, B and C. The system will record information so that subsequently, the system 100 will be able to identify what messages, and the subject matter thereof, have been sent to user X and who else has received, or been sent, the same message of that subject matter, in combination with User X.

In one embodiment, the system 100 can analyze the words used in messages to identify different types of words and patterns. Subsequently, when a message is to be sent, the types of words and patterns can be recognized and compared against messages sent to other contacts in order to identify contacts to whom the current message might be sent, based on the similarity in words and patterns. For example, different words or terminology might be used when sending a message to a close relation as compared to a less familiar or known contact. Different language or patterns might be used with friends or business contacts, than with a spouse, parent or child, for example.

The system 100 can also be configured to analyze and identify different languages used in communications. For example, a message written in English can be associated with other contacts who are party to communications in English. A message written in Finnish can cause the system to identify those contacts on the basis of who may have received similar communications in the Finnish language.

In another embodiment, the system 100 can parse the message to identify the greeting and name of the intended contact, prior to the addressing of the message. For example, the system 100 can identify that a message begins with the greeting "Hi Anna". The system 100 will parse the message and then present the user with an adaptive recipient list that includes all contacts named "Anna".

In one embodiment, the system 100 is able to rank the contacts in an order to correlate the number of times each contact has been a recipient of a message in combination with the same message also sent to another contact. Thus, when a user is creating a message and has selected at least one recipient, the system and user will be able to determine whom else they have sent messages to in combination with this recipient(s), and how often such combinations have been used.

Figure 2:
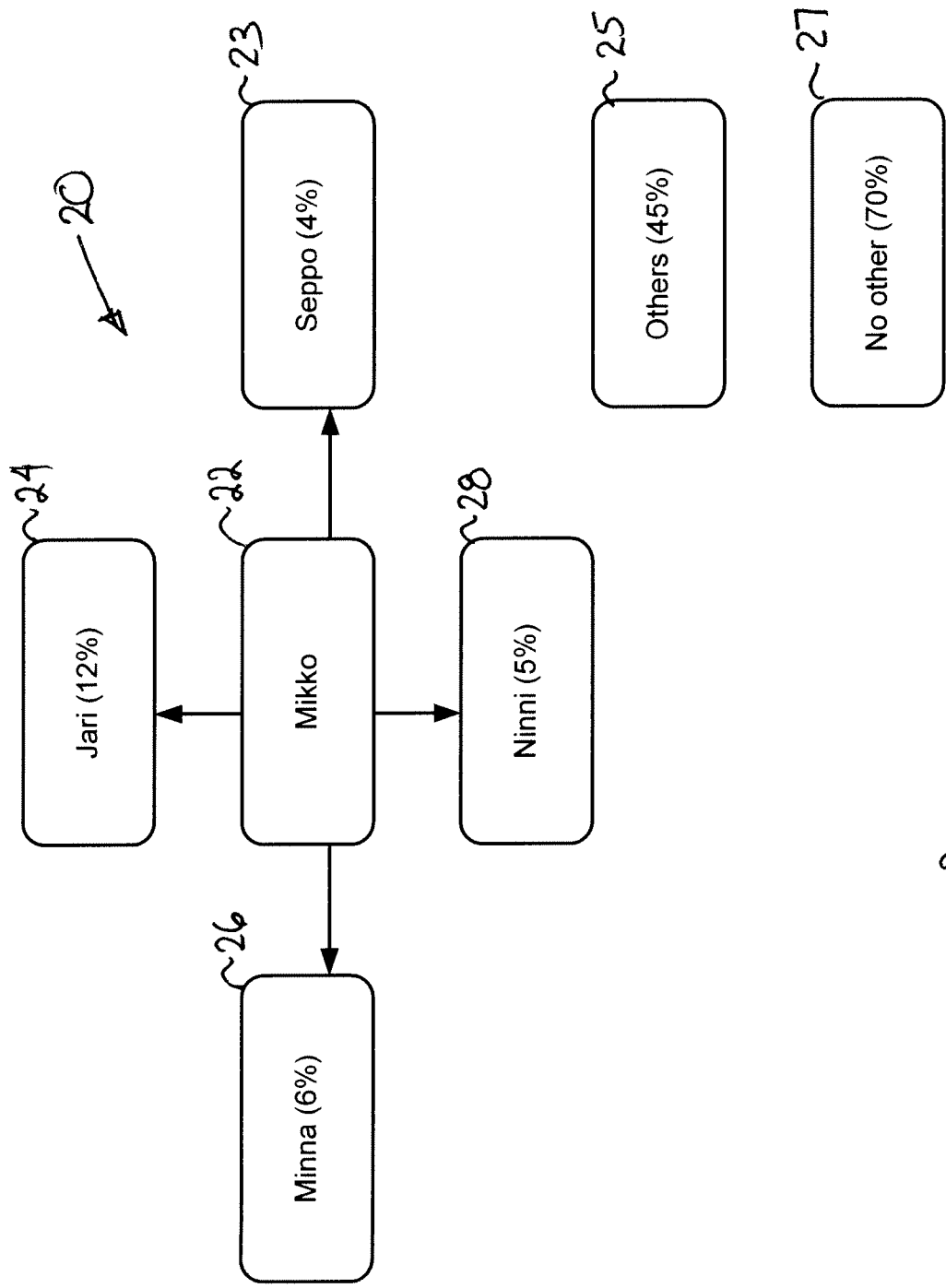
FIG. 2 illustrates one example of an additional recipient ranking in accordance with aspects of the disclosed embodiments.

For example, referring to FIG. 2, when contact Mikko 22 is designated as a recipient of an electronic message, from for example, a contact list such as an address book or phone book, an additional recipient list will be presented to the user that identifies those other contacts, such as Jari 24, Minna 26 and Seppo 23, that have also been recipients of the same messages sent to Mikko 22.

The additional recipient list can be visualized or presented to the user in different ways. In one embodiment, an image grid with contact images can be presented. In another embodiment, a voice-based solution can be provided where the user selects a recipient using voice command and system informs the user which contacts are likely to be combined as recipients of the communication. This can improve the efficiency of use of messaging, since in many cases a user may send the same message(s) to the same or similar groups of users or contacts.

In one embodiment, a contact list could include a first adaptive part that is created based on information of to whom the message is sent if it is sent for example to Mikko 22. The number of contact names on this list could be defined by the system or by the user in a settings menu, for example. Then, after the adaptive contacts list, a normal or standard contact list could be presented. The list could be visible as one list to a user.

The contact or recipient list can be derived from any suitable contact application, such as an address book or a phone book application. In alternate embodiments any suitable contact application can be used, including for example, a frequent contact, a recently used contacts list or most used contacts list.

In the example of FIG. 2, user Anna (not shown) has selected Mikko 22 as a recipient of a communication, such as for example an email. In accordance with the disclosed embodiments, once the user selects Mikko 22 as the intended recipient, the system will identify all other users who have received messages also sent to Mikko 22 or participated in calls with Mikko 22 as a participant. In this case, the system of the disclosed embodiments identifies Jari 24, Minna 26, Ninni 28 and Seppo 23 as also being past recipients of the same messages sent by Anna to Mikko 22. This list can be presented to the user and the user can then select the desired recipient(s) for the communication from the list.

As shown in FIG. 2, in one embodiment, the system of the disclosed embodiments ranks the other contacts according to how often these contacts were included on, or recipients of, messages sent from Anna to Mikko 22. For example, as shown in FIG. 2, when Anna has sent a message to Mikko 22, it is determined that she has also selected Jari 22 as the recipient of the same message 12% of the time. Minna 26 has been selected to receive the same message from Anna in combination with Mikko 6% of the time. Ninni 28 has been selected in combination with Mikko 5% of the time and Seppo 23 has been selected in combination with Mikko 4% of the time. In 45% of the instances where Anna sent a message to Mikko, there were also other recipients, designated as Others 25. These Others 25, in total, accounted for percentages that have been to be determined to be below a value that is not of interest. Thus, the category Others 25 generally represents very occasional message recipients, or statistically not relevant. This threshold could be for example, less than 1% of the cases. In alternate embodiments, this threshold could be set to any desired or suitable value. In one embodiment, the Others 25 icon can represent a selectable object, that when activated or "clicked on", displays a list of each contact that makes up the Others 25 category, together with a ranking or percentage statistic.

As shown in FIG. 2, in one embodiment, a No Other 27 category can be included, which can be represented by an icon or object. In the example of FIG. 2, this No Other 27 category or ranking means that in 70% of the cases a message was sent from Anna to Mikko 22, with Mikko being the sole recipient. It should be noted that, in the example shown here, the total sum of the percentages is greater than 100% because one message can have many recipients.

While a ranking tree 20 is shown in FIG. 2, it should be noted that the ranking results or additional recipient list can be presented to the user on a display of a device in any suitable manner. In the example of FIG. 2, the results might be presented in the form of a tree, where the user can click on a desired additional recipient shown, who is than added to the distribution list for the email or other message. Alternatively, the results shown in FIG. 2 can be presented to the user as a list on the screen of the device. In another embodiment, the additional recipients might automatically be added to the distribution list of the message. When the user moves the cursor over or near a recipient, the ranking information could be displayed in a pop-up box, or temporary icon. The user could then determine whether or not to keep the proposed additional recipient on the distribution list.

In one embodiment, the user will have the option to select which of the additional recipients are to receive the current message. The list can be presented in a rank order, so as to suggest to certain contacts when Mikko 22 is selected as a recipient. For example, if the additional recipients are presented in a list, the list could include a selection box or check box next to each name. Selection of a box could cause to additional recipient to be added to the distribution list of the message. Alternatively, a desired recipient could be selected and dragged into the distribution list. In alternate embodiments, any suitable mechanism can be used to view, select and add a recipient from a list into a distribution of a message in accordance with the disclosed embodiments.

Figure 3:
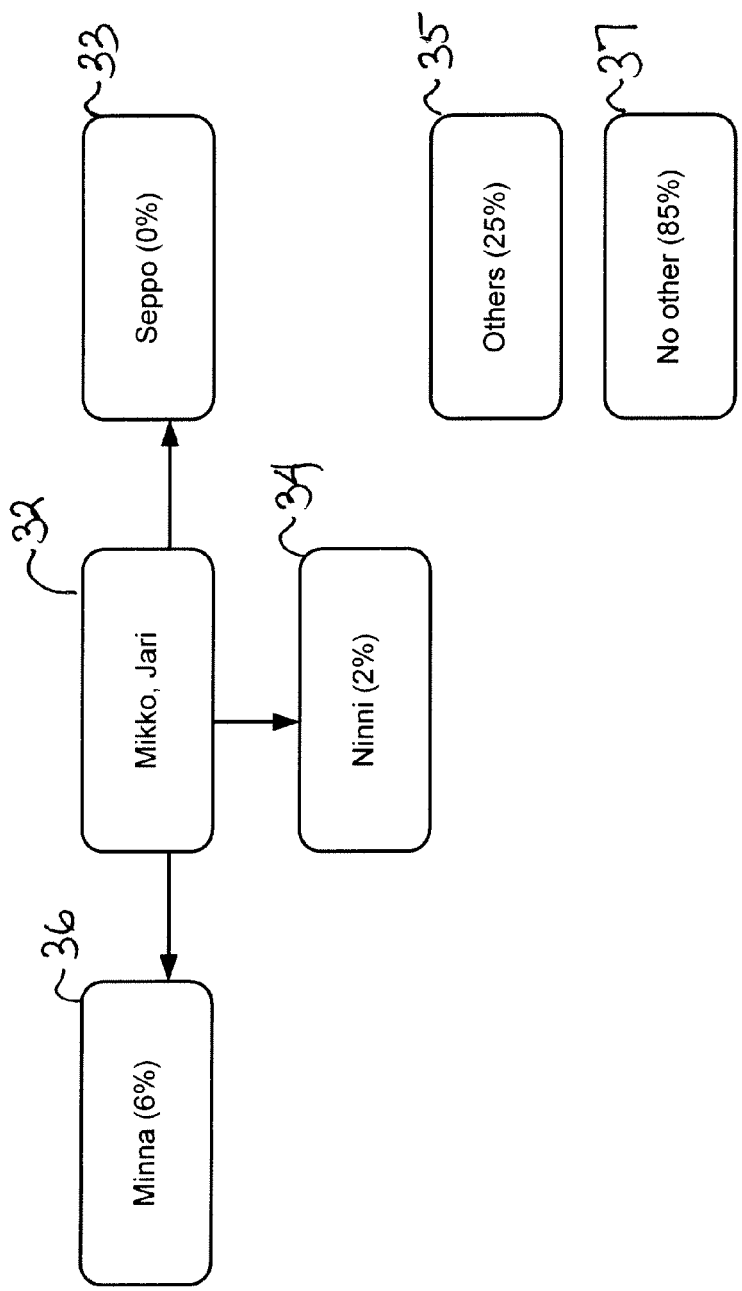
FIG. 3 illustrates another example of an additional recipient ranking according to the disclosed embodiments when two recipients are selected.

FIG. 3 illustrates an example of an embodiment where the user has selected or designated two recipients for a message. In this example, both Mikko and Jari are shown in the recipient box 32 as the designated recipients of the message. If the user was working from the example shown in FIG. 2, the user might have selected Jari 24 to be added to the distribution list in combination with Mikko 22. Alternatively, the user might have initially selected the combination of Mikko and Jari to be the recipient of the message. In accordance with the aspects of the disclosed embodiments, the system will determine what other contacts the user has sent messages to or received messages from, when having sent a message to the combination of Mikko and Jari or received a message in combination with Mikko and Jari.

As shown in FIG. 3, additional recipients Seppo 33, Ninni 34, and Minna 36 are shown. The similarity in names between those in FIG. 2 and FIG. 3 is merely exemplary and only for convenience purposes. In alternate embodiments, the names or contacts that might be presented in FIG. 3, when a combination of Mikko and Jari (or some other contact) is selected as the distribution list, could be different from those shown in FIG. 2, where only Mikko 22 is selected.

In the example of FIG. 3, when the combination 32 of Mikko and Jari has been designated or selected as the distribution list, the user has also selected Minna 6% of the time and Ninni 2% of the time. Seppo 33, which is shown for comparison purposes, is shown as not having been selected as a recipient when the message is going to the combination 32 of Mikko and Jari. Thus, the ranking for Seppo 33 for this combination is indicated as 0%. In alternate embodiments, a ranking for Seppo 33 might not be presented at all in the adaptive recipient list when the ranking is 0%. The Others category 35 accounts for 25% of all instances, while the No Other category 37 accounts for 85% of all instances. Thus, once the user makes the selection of Mikko and Jari, the system calculates an additional recipient list as shown in FIG. 3. This allows the user to identify who else has been a recipient of a message, when the combination 32 of Mikko and Jari is designated, and who might therefore also be considered for the current message. For each combination of selected recipients, a new or updated ranking list can be presented to the user. It should be understood that the term "user" designates the owner of the messaging application, or the contact that will be designated as the "From" in the message.

In alternate embodiments, different rules or criterion can be applied when defining the adaptive list. Criteria information from different sources can be combined using certain predefined rules. The criteria information does not need to be defined by weighting or percentage numbers. In alternate embodiments, an suitable criteria can be used simultaneously to create an adaptive contact list.

For example, Same recipient" criteria/Weight 50%
"Amount of sent messages to this contact" criteria/Weight 25%
"When messages have been received" criteria/Weight 25%
Criteria Score Check for Anna:
"Same recipient" criteria/Weight 50%
Score=9 out of 10, after weighting score 4.5
"Amount of sent messages to this contact" criteria/Weight 25%
Score=8 out of 10, after weighting score 2
"When messages have been received" criteria/Weight 25%
Score=6 out of 10, after weighting score 1.5
Total 8 points
Criteria Score Check for Mikko:
"Same recipient" criteria/Weight 50%
Score=6 out of 10, after weighting score 3
"Amount of sent messages to this contact" criteria/Weight 25%
Score=8 out of 10, after weighting score 2
"When messages have been received" criteria/Weight 25%
Score=10 out of 10, after weighting score 2.5
Total 7.5 points This means that Anna is shown before Mikko in the adaptive recipient list if above shown weights are used. Ways to define score can naturally change case by case.

In one embodiment, in the case when there are already two or more recipients selected, certain weighting can be given to contacts that have been contacted at the same time with Mikko in earlier cases. One weighting can be assigned for contacts that have been contacted at the same time with Jari and a different weighting can be assigned for contacts that have been contacted at the same time with both Mikko and Jari. In this example, the Jari and Mikko combination is not the only combination used to define which contacts are the next ones to be most likely added as message recipient.

Figure 4:
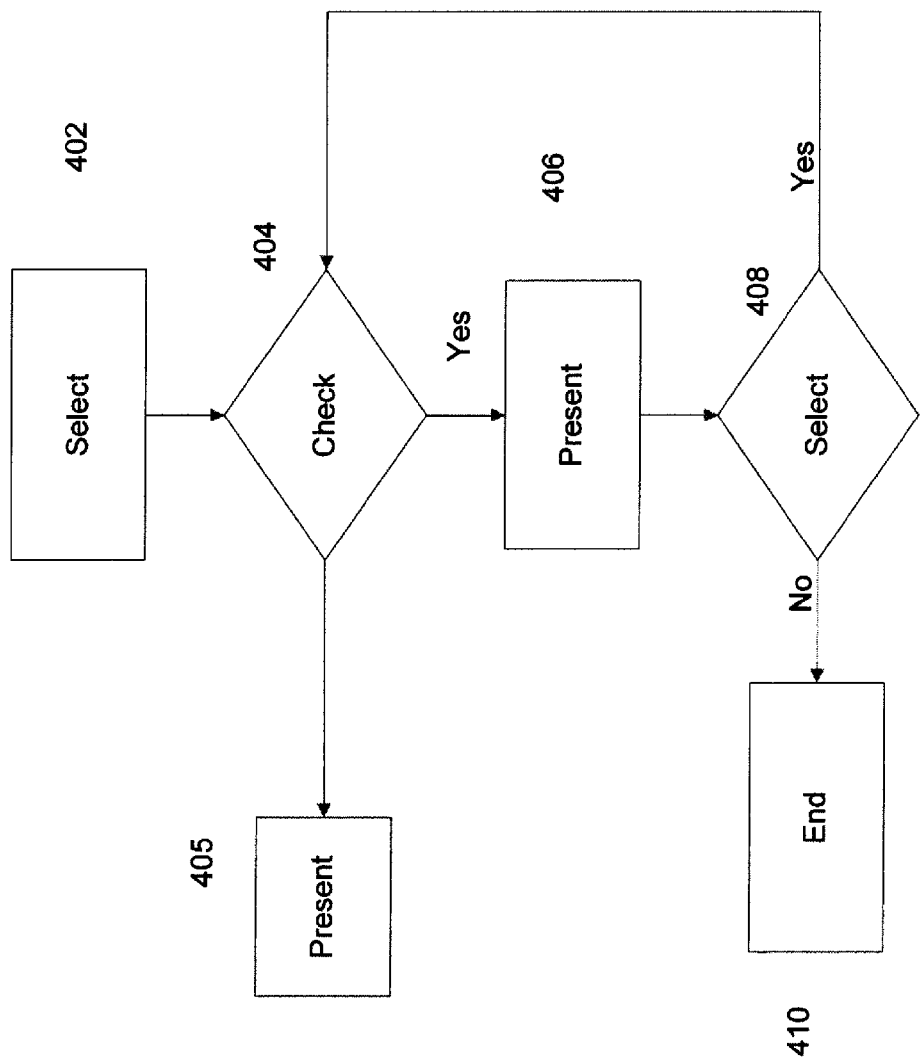
FIG. 4 illustrates one example of a process to develop an additional recipient list according to the aspects of the disclosed embodiments.

FIG. 4 illustrates one example of a process including aspects of the disclosed embodiments. The user or owner of the messaging application selects 402 at least one recipient of a message or invitation, such as for example an email, text message, chat message or invitation or conference invitation. The system then calculates 404 what other contact(s) has been the recipient of a message in combination with the selected at least one recipient, described herein as the "additional recipient(s)". If no other additional recipient(s) are found, such information can be presented 405 to the user and the additional recipient determination process can end 410.

If additional recipient(s) are determined, the results or ranking list can be presented 406 to the user. The user can select 408 one or more additional recipient(s) from the list to be added to the distribution list for the message. When another recipient is selected or added to the distribution list, another check 404 is made. It should be noted that while it is suggested here that the additional recipient is selected from the list, in alternate embodiments, the user may add another recipient to the distribution that it is not on the list. The same check 404 will be carried out by the system. Once the user elects not to add any more recipients to the distribution list, the process ends 410. In one embodiment, the process ending means that the user sends the message. Alternatively, the user may have a selection option to close the additional recipient application.

Figure 5:
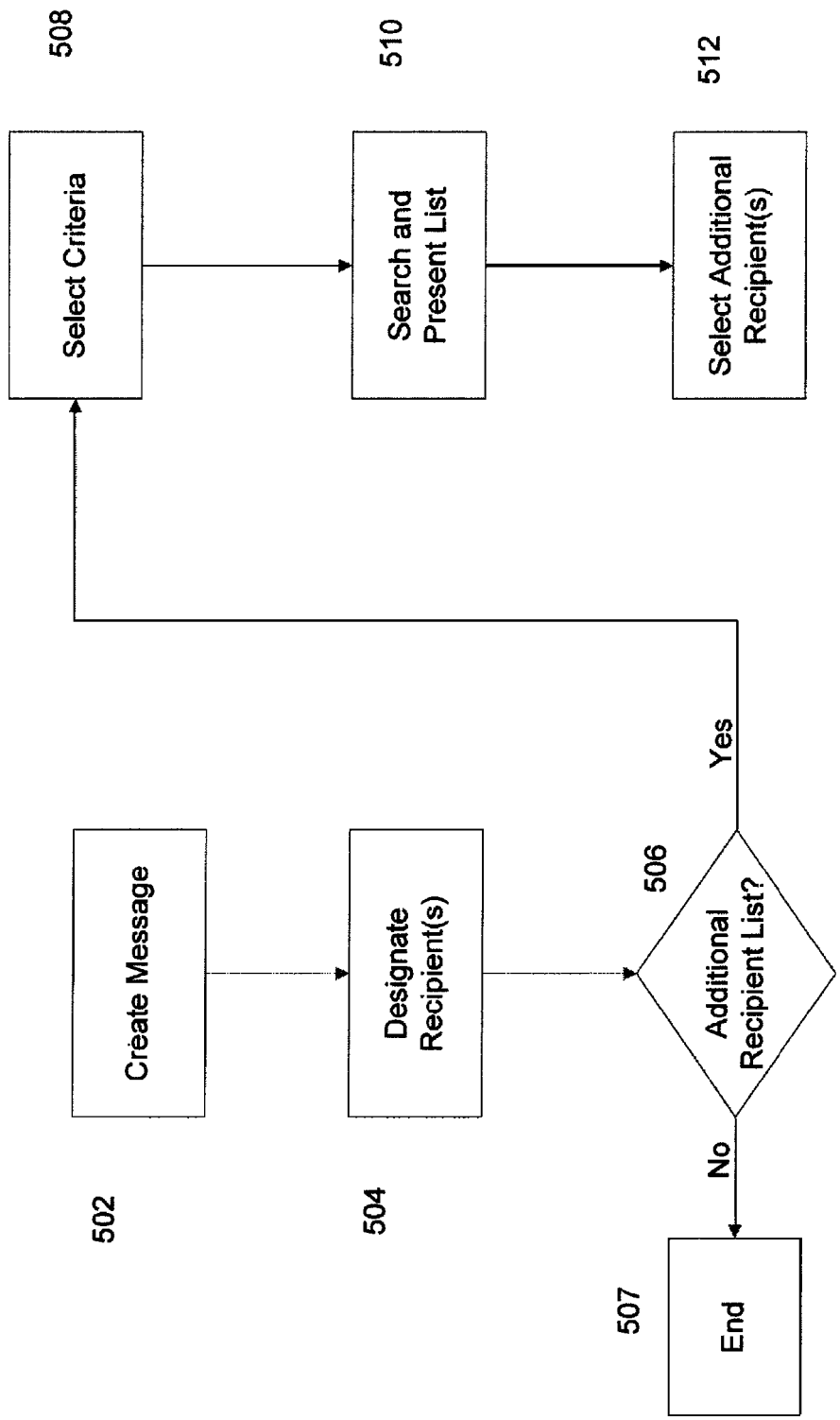
FIG. 5 illustrates another example of a process to develop an additional recipient list in accordance with the aspects of the disclosed embodiments.

FIG. 5 illustrates another process of the disclosed embodiments. A user creates a message 502. One or more recipients of the message are designated 504. The user can then be asked 506 whether an additional recipient list is desired. If yes, the user can select 508 the additional recipient list selection criteria. The selection criteria can include for example the subject matter of the message, contacts that have previously been the recipient of or party to messages in combination with the designated recipient. If subject matter is selected, the system parses the message to determine the subject matter reference and correlates that with data associated with each contact. Once the selection criteria are made and the contact application searched, the additional recipient list is presented 510 to the user. The user can the select 512 which other contacts are to be recipients of the message. In one embodiment, the selection 512 is automatic, and the user will de-select contacts who are not to receive the message.

In one embodiment, relationships between and among message recipients can be used, in conjunction with information related to whom a user sends messages to, to develop the adaptive message recipient list. For example, in one embodiment, the system can retain information related to the subject matter of messages sent to recipients. Thus, the system will be able to determine not only what recipients a user has sent messages to in combination with others, but will also be able to rank such recipients on the basis of the subject matter of such messages. In one embodiment, the check 404 of FIG. 4 can include only a check and determination of what other contacts have received messages of the same or similar subject matter, not including if they were also recipients of messages in combination with others.

In alternate embodiments, any suitable criteria can be used to parse and select the additional recipient(s) list. The criteria information from different sources can be combined using pre-defined rules to rank the criteria and establish weightings. A different weighting can be applied to different criteria, as some criteria can be considered more important than other criteria. For example, the criteria can be date based, where contacts must have also received and/or sent messages within a pre-determined time period in order to be selected to the list. A recently used contact log could also be used to set the criteria for, and add recipients to the adaptive additional recipient(s) list. Some other criteria and weighting examples are as follows:

| CRITERIA | WEIGHTING |
|---|---|
| Same Recipient | 50% |
| Amount of sent messages to this contact | 25% |
| When messages have been received | 25% |

In one embodiment, the order of results of a contact search can be prioritized based on the relationship between a selected contact and another contacts messaging ranking. For example, Mikko selects Gary to receive a message. Mikko then wishes to search the contact database for another contact that can be searched with an "Ha" search string. In this embodiment, the search results will be prioritized where the results are ordered on the number of times a contact in the list has received a message from Mikko at the same time as Gary. In this example, Mikko has three contacts that satisfy the search string "Ha". These are Harry, Hank and Hanna. Harry has received messages from Mikko in combination with Gary. Hanna has been selected to receive messages from Mikko in combination with Gary, but not as frequently as Harry. However, Hank has never received a message from Mikko in combination with Gary. Thus, the search results will rank Harry higher than Hanna and Hank, even though, alphabetically, this sequence is out of order. While this example implies that the results are shown in a list, in alternate embodiments, any suitable manner of distinguishing that Harry has been selected as a recipient of a message from Mikko in combination with Gary more times than Hanna or Hank can be used.

The disclosed embodiments can be used in applications such as messaging, chatting, electronic mail, conference calls, Internet services and Internet calls, for example. In alternate embodiments, applications can include those applications where a distribution list is selected. The selection criteria and information related to the additional recipient list can be stored in a memory of a device. In an alternate embodiment, the criteria and information can be stored in an external storage device or server with which the device communicates during a message creation and transmission process.

In one embodiment, the prior message and recipient data, selection criteria, information and list can be stored in a database application. The database can be built in such as way that separate database tables are created for different message types. For example, email recipients and information can be stored in one table, while SMS messaging data and voice messaging data can be stored other, respective tables. If the selection criterion includes a message type, the system can look to the specific table to create the recipient list. Alternatively, the system can check each table in the database in order to create the adaptive recipient list.

The aspects of the disclosed embodiments can be implemented on any device that includes a user interface for the display and accessing of information, such as the system 100 shown in FIG. 1. In one embodiment, the input device 104 can generally comprise a keypad or other suitable input mechanism. For example, in one embodiment, the input device 104 can include a touch screen display 112. The inputs and commands from a user, such as the touching of the screen, are received in the input module 104 and passed to the navigation module 122 for processing. The navigation module 122 can determine and set the state of the device. The output device 106, can receive data from the user interface 102, application 180 and storage device 182, for output to the user in a suitable format.

Each of the input device 104 and output device 106 are configured to receive data or signals in any format, configure the data or signals to a format compatible with the application or device 100, and then output the configured data or signals. While a display 114 is shown as part of the output device 106, in other embodiments, the output device 106 could also include other components and device that transmit or present information to a user, including for example audio devices and tactile devices.

The user input device 104 can include controls that allow the user to interact with and input information and commands to the device 100. The output device 106 can be configured to provide the content of the exemplary screen shots shown herein, which are presented to the user via the functionality of the display 114. Where a touch screen device is used, the displays 112 and 114 can comprise the same or parts of the same display. User inputs to the touch screen display are processed by, for example, the touch screen input control 112 of the input device 104. The input device 104 can also be configured to process new content and communications to the system 100. The navigation module 122 can provide controls and menu selections, and process commands and requests. Application and content objects selection and activation can be provided by the menu control system 124. The process control system 132 can receive and interpret commands and other inputs, interface with the application module 180, storage device 180 and serve content as required. Thus, the user interface 102 of the embodiments described herein, can include aspects of the input device 104 and output device 106.

Figure 6A:
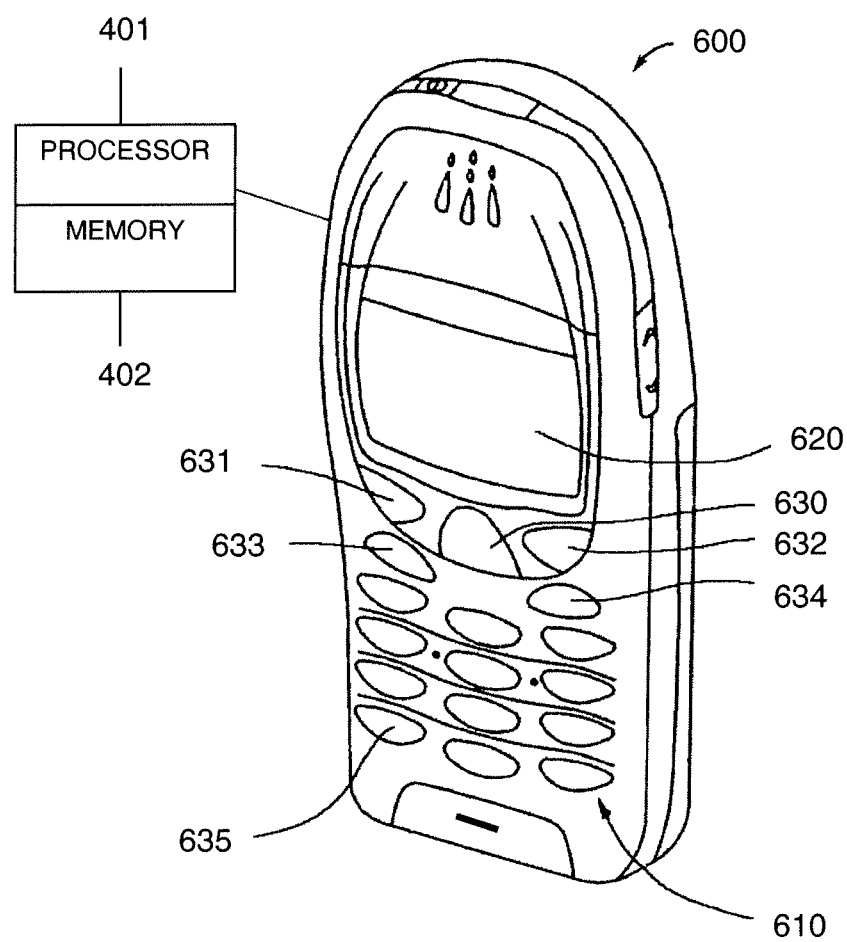
FIGS. 6a and 6b illustrate examples of exemplary devices that can be used to practice aspects of the disclosed embodiments.
Figure 6B:
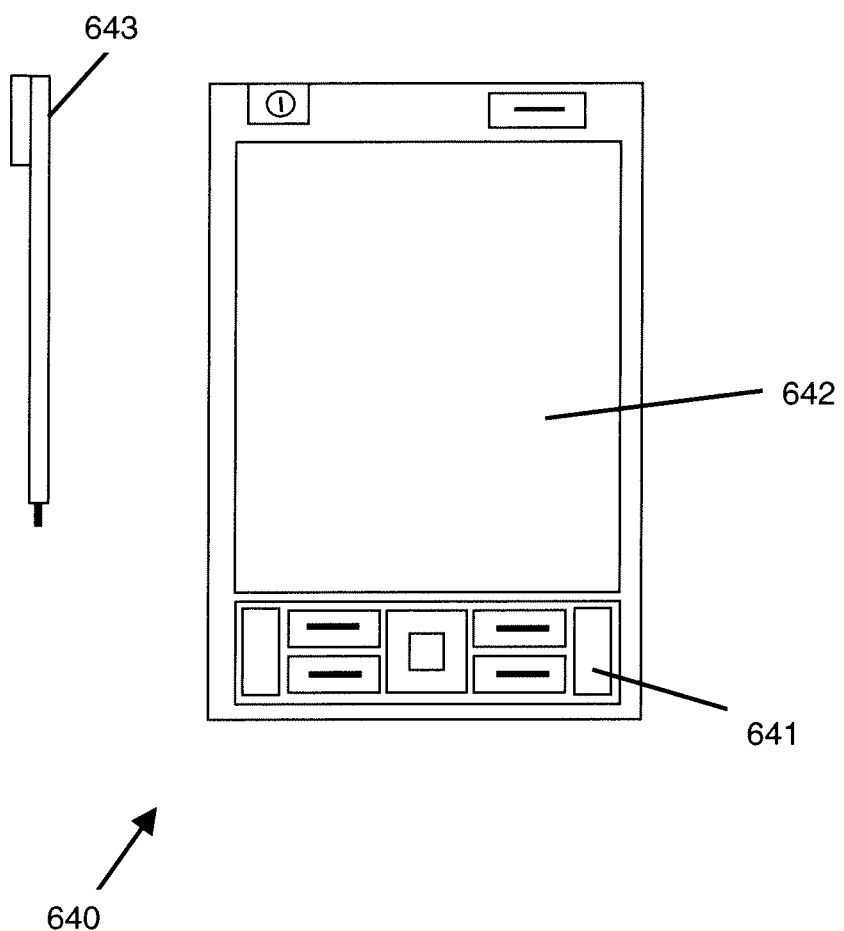

Examples of devices on which aspects of the disclosed embodiments can be practiced are illustrated with respect to FIGS. 6A and 6B. In alternate embodiments, the devices can include device that has or uses a contact application. The terminal or mobile communications device 600 may have a keypad 610 and a display 620. The keypad 610 may include any suitable user input devices such as, for example, a multi-function/scroll key 630, soft keys 631, 632, a call key 633, an end call key 634 and alphanumeric keys 635. The display 620 may be any suitable display, such as for example, a touch screen display or graphical user interface. The display may be integral to the device 600 or the display may be a peripheral display connected to the device 600. A pointing device, such as for example, a stylus, pen or simply the user's finger may be used with the display 620. In alternate embodiments any suitable pointing device may be used. In other alternate embodiments, the display may be a conventional display. The device 600 may also include other suitable features such as, for example, a camera, loud speaker, connectivity port or tactile feedback features. The mobile communications device may have a processor 601 connected to the display for processing user inputs and displaying information on the display 620. A memory 602 may be connected to the processor 601 for storing any suitable information and/or applications associated with the mobile communications device 600 such as phone book entries, calendar entries, etc.

In one embodiment, the system 100 of FIG. 1 may be for example, a PDA style device 640 illustrated in FIG. 6B. The PDA 640 may include one or more of the following features, a keypad 641, a touch screen display 642 and a pointing device 643 for use on the touch screen display 642. In still other alternate embodiments, the device may be a personal communicator, a tablet computer, a laptop or desktop computer, a television or television set top box, or any other suitable device capable of containing the display 642 and supported electronics such as a processor and memory, and capable of including a contact application and/or database. The exemplary embodiments herein will be described with reference to the mobile communications device 600 for exemplary purposes only and it should be understood that the embodiments could be applied equally to any suitable device incorporating a display, processor, memory and supporting software or hardware, that can be used with or include a contacts application, address book or phone book.

The user interface 102 of FIG. 1 can also include a menu system 124 in the navigation module 122. The navigation module 122 provides for the control of certain states, processes and utilities of the device 100. The menu system 124 can provide for the selection of different tools and application options related to the applications or programs running on the device 100. In the embodiments disclosed herein, the navigation module 122 receives certain inputs, such as for example, signals, transmissions, instructions or commands related to the functions of the device 100. Depending on the inputs, the navigation module interprets the commands and directs the process control 132 to execute the commands and the process of the disclosed embodiments accordingly. In one embodiment, the menu system 124 can allow of the selection of a contact entry and the de-selection of a contact entity. The navigation module 122 can also control the automatic parsing and checking of the contact entries in the contact application for subject matter flags and other use indicators, as described herein. The navigation module 122 and process control 132 can interpret the flags and control the updating of contact entries in accordance with the aspects of the disclosed embodiments.

In one embodiment, the navigation module 122 can include a proximity detection system that is configured to detect a presence of contacts within a pre-determined zone or range. For example, when a contact is selected as a message recipient, the system 100 can detect whether the selected recipient is within a certain range, or even available, to receive the message. Thus, when the additional contact list is created, the list can include an indication as to whether the additional contact is within the pre-determined area as well as whether the additional contact has an active presence indication.

The proximity detection system of the navigation module 122 can also be used to track a location of each contact when a message is sent. In one embodiment, the location information can be used to correlate location information to the selection criteria for the additional contact list. For example, Mikko selects Harry to receive a message. The system 100 can identify those recipients who are shown as being in the substantially same location, or often being in the same location as Harry, as the additional contacts. The location could be a precise location, a general region or other defined area(s). The system 100 can also track a number of times a contact is in the same general area as another contact. When the additional contact list is created, this information can also be used to parse the selection criteria and list.

Activating a control generally includes any suitable manner of selecting or activating a function associated with the device, including touching, pressing or moving the input device. In one embodiment, where the input device 104 comprises control 110, which in one embodiment can comprise a device having a keypad, pressing a key can activate a function. Alternatively, where the control 110 of input device 104 also includes a multifunction rocker style switch, the switch can be used to select a menu item and/or select or activate a function. When the input device 104 includes control 112, which in one embodiment can comprise a touch screen pad, user contact with the touch screen will provide the necessary input. Voice commands and other touch sensitive input devices can also be used.

Although the above embodiments are described as being implemented on and with a mobile communication device, it will be understood that the disclosed embodiments can be practiced on any suitable device that can include or interface with a contact application, phone book or address book. For example, the device 100 of FIG. 1 can generally comprise any suitable electronic device, such as for example a personal computer, a personal digital assistant (PDA), a mobile terminal, a mobile communication terminal in the form of a cellular/mobile phone, or a multimedia device or computer. In alternate embodiments, the device 100 of FIG. 1 may be a personal communicator, a mobile phone, a tablet computer, a laptop or desktop computer, a television or television set top box a DVD or High Definition player or any other suitable device capable of containing for example a display 114 shown in FIG. 1, and supported electronics such as the processor 601 and memory 602 of FIG. 6A. For description purposes, the embodiments described herein will be with reference to a mobile communications device for exemplary purposes only and it should be understood that the embodiments could be applied equally to any suitable device incorporating a display, processor, memory and supporting software or hardware. The device 100 may also include other suitable features such as, for example, a camera, loudspeaker, connectivity port or tactile feedback features.

Figure 7:
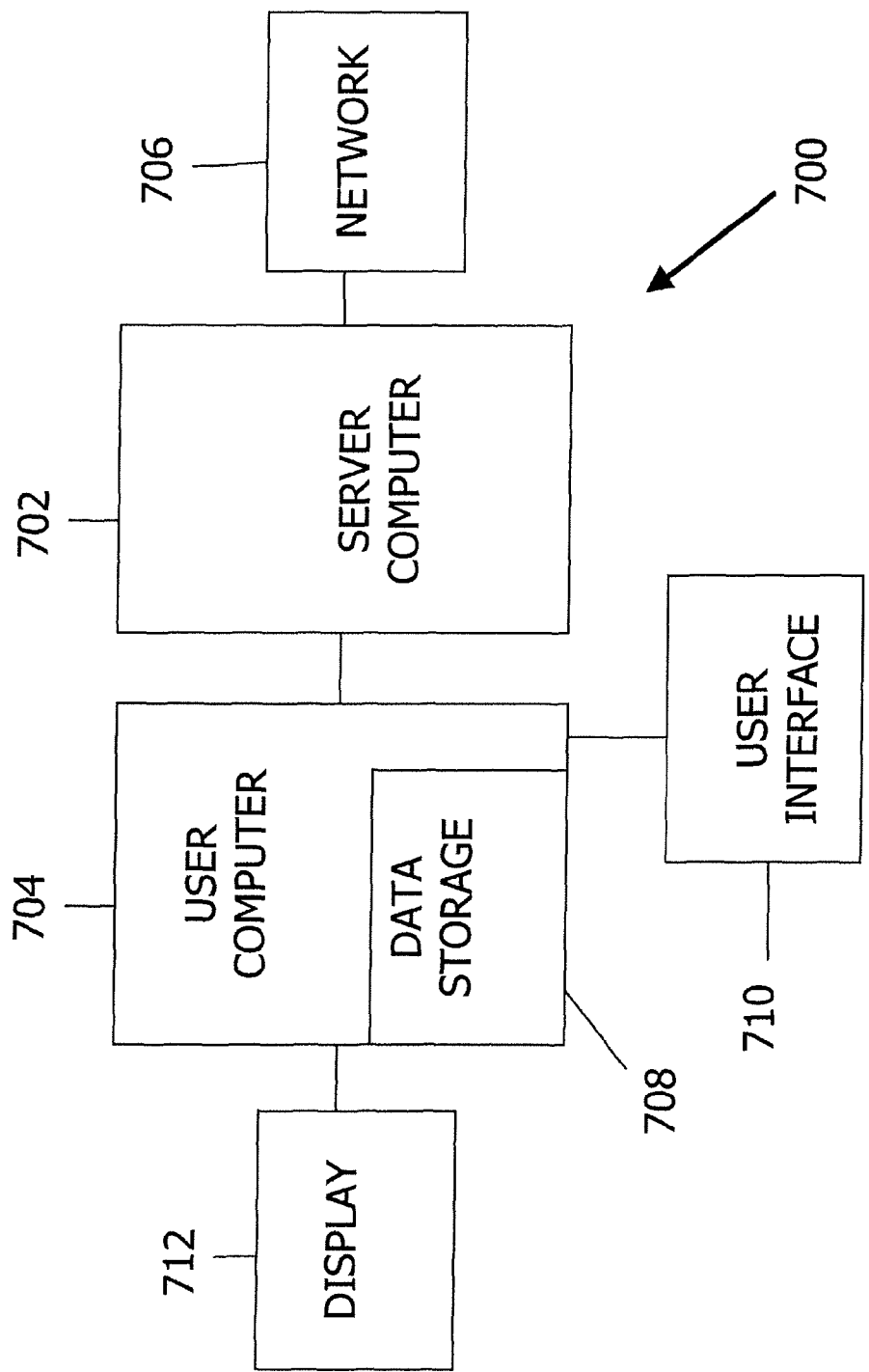
FIG. 7 illustrates one example of an architecture that can be used to practice aspects of the disclosed embodiments.

The disclosed embodiments may also include software and computer programs incorporating the process steps and instructions described above that are executed in different computers. FIG. 7 is a block diagram of one embodiment of a typical apparatus 700 incorporating features that may be used to practice aspects of the invention. The apparatus 700 can include computer readable program code means for carrying out and executing the process steps described herein. As shown, a computer system 702 may be linked to another computer system 704, such that the computers 702 and 704 are capable of sending information to each other and receiving information from each other. In one embodiment, computer system 702 could include a server computer adapted to communicate with a network 706. Computer systems 702 and 704 can be linked together in any conventional manner including, for example, a modem, wireless, hard wire connection, or fiber optic link. Generally, information can be made available to both computer systems 702 and 704 using a communication protocol typically sent over a communication channel or through a dial-up connection on ISDN line.

Computers 702 and 704 are generally adapted to utilize program storage devices embodying machine-readable program source code, which is adapted to cause the computers 702 and 704 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 702 and 704 may also include a microprocessor for executing stored programs. Computer 702 may include a data storage device 508 on its program storage device for the storage of information and data. The computer program or software incorporating the processes and method steps incorporating aspects of the invention may be stored in one or more computers 702 and 704 on an otherwise conventional program storage device. In one embodiment, computers 702 and 704 may include a user interface 510, and a display interface 712 from which aspects of the invention can be accessed. The user interface 710 and the display interface 712 can be adapted to allow the input of queries and commands to the system, as well as present the results of the commands and queries.

The disclosed embodiments allow a user to easily determine, when creating a message, what other recipients have received other messages, or messages of a similar or same subject matter, in combination with the selected recipient. When a user sends or receives a message, the system stores information and data related to the combination of recipients of the message. When a new message is created, the system can identify the initially selected recipient(s) and present a list of other contacts that have also be selected to receive a message in combination with the selected recipient(s). The list can be ranked so that the user can understand the frequency or percentage of occasions when such combinations have been made. Other criteria may also be used to create the list, such as for example, a subject matter of the message, the last contact with the additional recipient, or a frequency of contact. This gives the user the advantage to easily and quickly group users and send messages to groups of users without the need to pre-assign groups.

It should be understood that the foregoing description is only illustrative of the embodiments. Various alternatives and modifications can be devised by those skilled in the art without departing from the embodiments. Accordingly, the disclosed embodiments are intended to embrace all such alternatives, modifications and variances that fall within the scope of the appended claims.

The invention claimed is:

1. A method comprising:
   receiving selection, in a communication application, of at least one recipient, from a list of contacts, to receive a communication, wherein the communication comprises a message;
   in response to the selection of the at least one recipient, automatically identifying and causing at least one additional recipient to be presented to a user, wherein the at least one additional recipient comprises a contact who has been party along with the at least one selected recipient to at least one other message, wherein the at least one other message is unrelated to the message; and
   allowing the user to select one or more of the at least one additional recipient to receive the communication.

2. The method of claim 1 further comprising causing the at least one additional recipient to be presented as a list and ranking each contact in the additional recipient list according to a frequency with which a communication that is sent to the at least one selected recipient has also been sent to the contact.

3. The method of claim 2 further comprising causing the ranking to be presented as a percentage of occurrences that when a communication is sent to the at least one selected recipient the same communication is sent to the contact.

4. The method of claim 2 further comprising automatically adding each contact from the additional recipient list to a distribution list for the communication prior to transmission of the communication.

5. The method of claim 2 further comprising causing each contact from the additional recipient list to be presented to the user for selection to a distribution list for the communication prior to transmission of the communication.

6. The method of claim 1, wherein two recipients are selected to receive the communication and the at least one additional recipient includes a list of contacts, where each contact has, in the past, been selected in combination with the two recipients, to receive the communication.

7. The method of claim 1, wherein the communication is an email, a text message, a voice mail, an instant message or a conference call invitation.

8. The method of claim 1, wherein identifying the at least one additional recipient is based on a subject matter of the communication wherein only those contacts who have received a communication from the at least one selected recipient related to the subject matter are included in the additional recipient list.

9. The method of claim 8, wherein the subject matter is identified by parsing a subject line of the communication and comparing the subject line to a stored subject matter field associated with each message related to each contact.

10. The method of claim 1 further comprising automatically designating each additional recipient as a recipient of the message and then de-selecting any undesired contact.

11. The method of claim 1 further comprising detecting a presence of each identified additional contact, determining whether the additional contact is available for the communication and causing an indication of the presence of the additional contact to be provided.

12. The method of claim 11, wherein detecting a presence comprises determining if the identified additional contact is within a pre-determined region.

13. The method of claim 11, wherein detecting a presence comprises determining if the identified additional contact is on-line.

14. An apparatus comprising:
   means for receiving selection, in a communication application, of at least one recipient, from a list of contacts, to receive a communication, wherein the communication comprises a message;
   means for automatically identifying and causing, in response to the selection of the at least one recipient, at least one additional recipient to be presented to a user, wherein the at least one additional recipient comprises a contact who has been party along with the at least one selected recipient to at least one other message, wherein the at least one other message is unrelated to the message; and
   means for allowing the user to select one or more of the at least one additional recipient to receive the communication.

15. The apparatus of claim 14, wherein the communication is an electronic mail message, a text message, an instant message, a voice mail or a conference call invitation.

16. The apparatus of claim 14, wherein the means for identifying the at least one additional recipient further comprises:
   means for identifying a subject matter of the communication;
   means for comparing the subject matter of the communication to a subject matter of other communications related to each contact in a contact application; and
   means for causing additional contacts to be presented where the subject matter of the communication is related to the subject matter of other communications.

17. The apparatus of claim 16 further comprising comparing the subject matter of the communication to a subject matter of other communications related to each contact identified as an additional recipient.

18. The apparatus of claim 14 further comprising means for ranking each additional recipient on a basis of a frequency with which other communications have been sent to the additional recipient in combination with the designated party.

19. Computer program product comprising a non-transitory computer readable medium having program code portions stored thereon, the program code portions being configured when said program code portions are run on a computer or network device, to:
   receive selection, in a communication application, of at least one recipient, from a list of contacts, to receive a communication, wherein the communication comprises a message;
   in response to the selection of the at least one recipient, automatically identify and cause at least one additional recipient to be presented to a user, wherein the at least one additional recipient comprises a contact who has been party along with the at least one selected recipient to at least one other message, wherein the at least one other message is unrelated to the message; and
   allow the user to select one or more of the at least one additional recipient to receive the communication.

20. The computer program product of claim 19, wherein the program code portions are further configured to rank each additional recipient according to a frequency with which a communication that is sent to additional recipient.

21. An apparatus comprising a processor and a memory including computer program code, the memory and the computer program code configured to, with the processor, cause the apparatus to:
   receive selection, in a communication application, of at least one recipient, from a list of contacts, to receive a communication, wherein the communication comprises a message;
   in response to the selection of the at least one recipient, automatically identify and cause at least one additional recipient to be presented to a user, wherein the at least one additional recipient comprises a contact who has been party along with the at least one selected recipient at least one other message, wherein the at least one other message is unrelated to the message; and
   allow the user to select one or more of the additional recipients to receive the communication.

* * * * *

UNITED STATES PATENT AND TRADEMARK OFFICE
CERTIFICATE OF CORRECTION

| | | |
|---|---|---|
| PATENT NO. | : 8,995,990 B2 | Page 1 of 1 |
| APPLICATION NO. | : 11/931453 | |
| DATED | : March 31, 2015 | |
| INVENTOR(S) | : Nurmi | |

It is certified that error appears in the above-identified patent and that said Letters Patent is hereby corrected as shown below:

In the claims:

Column 14,
 Lines 26 and 27, Claim 21 "recipient at least one other message," should read --recipient to at least one other message,--.

Signed and Sealed this
First Day of December, 2015

Michelle K. Lee
*Director of the United States Patent and Trademark Office*